United States Patent [19]
Nishihata et al.

[11] Patent Number: 5,663,884
[45] Date of Patent: Sep. 2, 1997

[54] MULTIPROCESSING APPARATUS

[75] Inventors: Kouji Nishihata, Tokuyama; Naoyuki Tamura, Kudamatsu; Shigekazu Kato, Kudamatsu; Atsushi Itou, Kudamatsu; Tsunehiko Tsubone, Hikari, all of Japan

[73] Assignee: Hitachi, Ltd., Tokyo, Japan

[21] Appl. No.: 461,523

[22] Filed: Jun. 5, 1995

Related U.S. Application Data

[63] Continuation of Ser. No. 941,905, Sep. 8, 1992, Pat. No. 5,448,470.

[30] Foreign Application Priority Data

Sep. 5, 1991 [JP] Japan ................... 3-252892

[51] Int. Cl.$^6$ ............................................. G06F 17/00
[52] U.S. Cl. ..................... 364/468.28; 364/478.16; 414/939; 414/940; 414/935
[58] Field of Search .................. 364/131–138, 364/474.11, 468, 469, 478, 468.01, 468.02, 468.19, 468.2, 468.22, 478.01, 478.05, 478.16, 478.17, 488–491; 414/935–941

[56] References Cited

U.S. PATENT DOCUMENTS

| | | | |
|---|---|---|---|
| 4,974,166 | 11/1990 | Maney et al. | 364/478 |
| 5,097,421 | 3/1992 | Maney et al. | 364/478 |
| 5,164,905 | 11/1992 | Iwasaki et al. | 364/468 |
| 5,448,470 | 9/1995 | Nishihata et al. | 364/131 |

Primary Examiner—Reba I. Elmore
Assistant Examiner—Thomas E. Brown
Attorney, Agent, or Firm—Antonelli, Terry, Stout & Kraus, LLP.

[57] ABSTRACT

A multiprocessing apparatus has a plurality of process processors connected to a carrier processor and controlled by a control system, wherein the apparatus includes connection information signal generating means for generating a connection information signal expressing information of connection of the plurality of process processors to the carrier processor, switching means for generating a registration information signal expressing information of registration of connection of the plurality of process processors to the carrier processor, and control means for carrying out a control process while logically judging a matching state between the connected process processors and the registered process processors by reference to the connection information and the registration information. Thus, it is possible to provide a multiprocessing apparatus in which process processors to be connected to the carrier processor can be increased or decreased in number easily and securely.

6 Claims, 8 Drawing Sheets

| INFORMATION NO. | PROCESSOR CONNECTION INFORMATION | REGISTRATION INFORMATION | RECOGNITION |
|---|---|---|---|
| PROCESSOR (1) | CONNECTED | REGISTERED | VALID |
| PROCESSOR (2) | UNCONNECTED | REGISTERED | INVALID |
| PROCESSOR (3) | CONNECTED | UNREGISTERED | INVALID |
| PROCESSOR (4) | UNCONNECTED | UNREGISTERED | INVALID |

FIG. 4

| | CARRIER PROCESSOR 10 | PROCESS PROCESSOR 30 | PROCESS PROCESSOR 40 | PROCESS PROCESSOR 50 |
|---|---|---|---|---|
| $2^0$ | STANDING-BY | STANDING-BY | STANDING-BY | STANDING-BY |
| | EXECUTION | EXECUTION | EXECUTION | EXECUTION |
| | ABNORMAL | ABNORMAL | ABNORMAL | ABNORMAL |
| | AUTOMATIC RUNNING | AUTOMATIC RUNNING | AUTOMATIC RUNNING | AUTOMATIC RUNNING |
| | | | | |
| | | | | |
| | | | | |
| $2^7$ | | | | |

MULTIPROCESSING APPARATUS

This application is a Division of application Ser. No. 07/941,905, filed on Sep. 8, 1992 now U.S. Pat. No. 5,448, 470.

BACKGROUND OF THE INVENTION

The present invention relates to a multi-processing apparatus and particularly to a control system for generally controlling a plurality of processors connected to a carrier processor.

A semiconductor producing apparatus for flexibly executing a semiconductor wafer process by using a vacuum processing apparatus having a plurality of processors connected to a carrier processor has been disclosed in JP-A-63-129641.

When the operation of the vacuum processing apparatus is continued while processors that are not necessary for the wafer process and processors that are inoperative are connected to the carrier processor, a wafer process control sequence in which these processors are excluded can be set in this type of semiconductor producing apparatus.

In such a vacuum processing apparatus, on the other hand, is required to facilitate alteration of the wafer process utilizing the same apparatus configuration and increase or decrease of the number of the processors therein in order cope with a variety of wafer processes.

The conventional vacuum processing apparatus is however, insufficient for matching the carrier processor and processors connected thereto. Thus, there arises a problem, in that, if there is any mismatching between the carrier processor and processors connected thereto, the vacuum processing apparatus as a whole fails in operation and the time required for clearing up the cause of the failure is so long that the working ratio of the apparatus becomes unacceptably low. That is, in the vacuum processing apparatus in which controllers for the carrier processor and process processors connected thereto perform controlling operations relationally, if the relational operations are mistaken with respect to an increase or decrease of the number of the processors or in connection with maintenance of the connection between the processors, neither the wafer carrying operation nor a process set by an operator cannot be performed, and therefore the operation of the apparatus is stopped.

Furthermore, wasteful electric power is consumed in the conventional vacuum processing apparatus because main circuit electric sources are turned on even for processors that are used. Moreover, because such main circuit electric sources are turned on, maintenance of processors not used cannot be made when the vacuum processing apparatus is in operation, so that the working ratio of the apparatus cannot be improved.

SUMMARY OF THE INVENTION

Therefore, an object of the present invention is to provide a multiprocessing apparatus in which processors to be connected to the carrier processor can be increased or decreased in number easily and securely.

In addressing the object, the present invention provides a multiprocessing apparatus comprising a carrier processor, a plurality of process processors connected to the carrier processor, and a control system for controlling the carrier processor and the plurality of process processors. The apparatus further comprises: connection information signal generating means for generating a connection information signal expressing information regarding the connection of the plurality of process processors to the carrier processor; switching means for generating a registration information signal expressing information regarding the registration of the connection of the plurality of process processors to the carrier processor; and control means for carrying out a control process while logically judging a matching state between the connected process processors and the registered process processors by reference to the connection information and the registration information.

Because the control means executes the controlling process while logically Judging the matching state between the actually connected processors and the registered processors by reference to the processor connection information and the processor registration information, the problems associated with conventional systems whereby process controlling is started while the processors are mismatched can be eliminated by the present invention.

DESCRIPTION OF THE PREFERRED EMBODIMENTS

An embodiment of the present invention will be described hereunder in detail with reference to the drawings.

Figure 1:
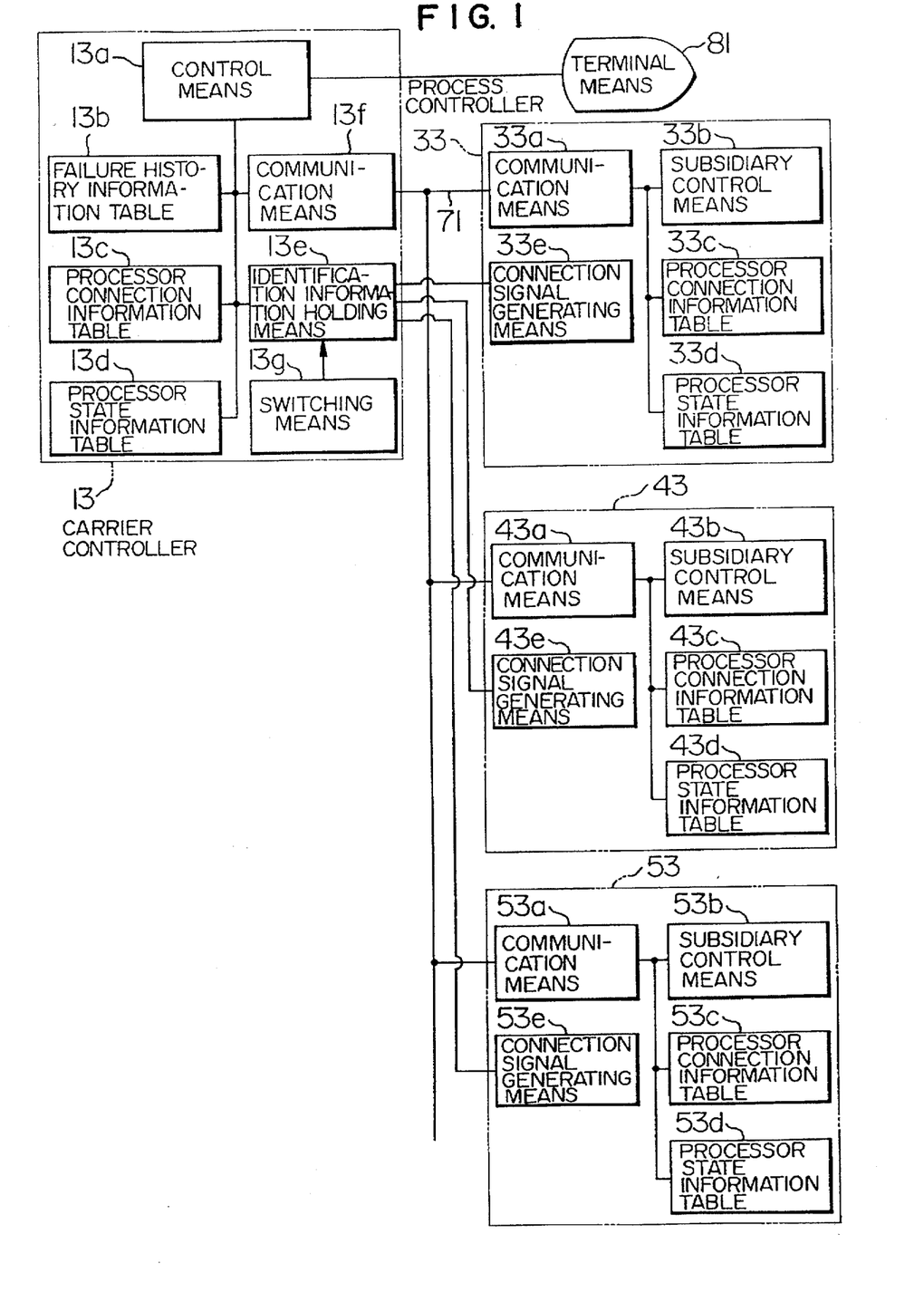
FIG. 1 is a block diagram of a control system of a semiconductor vacuum processing apparatus as an embodiment of the present invention.

FIG. 1 is a block diagram showing a control system of a semiconductor vacuum processing apparatus as an embodiment of the present invention. The schematic structure of the semiconductor vacuum processing apparatus will be described with reference to FIG. 2 before description of the operation of the control system.

Figure 2:
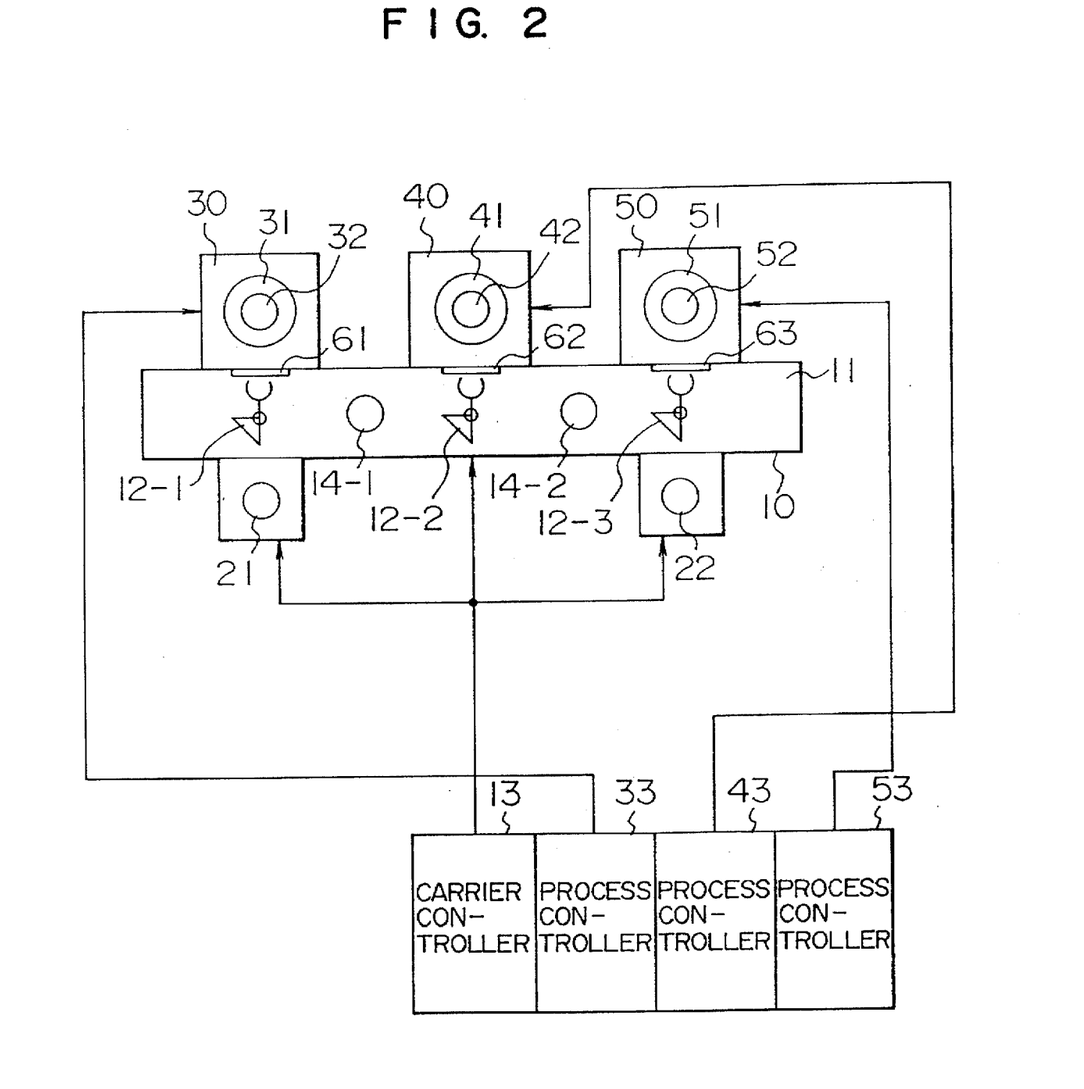
FIG. 2 is a constituent diagram showing the schematic configuration of the semiconductor vacuum processing apparatus.

Referring to FIG. 2, there is shown a semiconductor vacuum processing apparatus having three processors connected to a carrier processor. The carrier processor 10 has one side to which a load lock chamber 21 and an unload lock chamber 22 are connected, and the other three sides to which process processors 30, 40 and 50 for processing semiconductor wafers are respectively connected. Process processing chambers 31, 41 and 51 of the process processors 30, 40 and 50 are connected to a carrier processing chamber 11 of the carrier processor 10, respectively, through gate valves 61, 62 and 63 so that semiconductor wafers can be carried by an arm 12-1, 12-2, 12-3 of the carrier processing chamber 11 through the opened gate valves 61, 62 and 63. The wafers are transported between arms through stages 14-1 and 14-2. Electrodes 32, 42 and 52 for mounting semiconductor wafers thereon and discharge devices (not shown) for processing the semiconductor wafers are provided in the process processing chambers 31, 41 and 51, respectively. Further, vacuum exhaust devices for exhausting the process processing chambers are connected to the process processing chambers 31, 41 and 51, respectively.

A control system for controlling those parts has a carrier controller 13 for controlling the carrier processor 10, a process controller 33 for controlling the process processor 30, a process controller 43 for controlling the process processor 40, and a process controller 53 for controlling the process processor 50.

This semiconductor vacuum processing apparatus is systematized so that a semiconductor wafer to be processed is picked up from a load cassette (not shown) to the load lock chamber 21 by an air carrier (not shown) and then carried into an arbitrary one of the process processing chambers 31, 41 and 51 by the respective corresponding arm 12-1, 12-2, or 12-3, and the processed semiconductor wafer is then carried out to the unload lock chamber 22 and then returned to the original cassette or another cassette by the air carrier.

Examples of processes executed by the process processors 30, 40 and 50 are a film forming process, a CVD process, an etching process, etc. The process processors 30, 40 and 50 execute these processes under control by the process controllers 33, 43 and 53, respectively.

FIG. 1 shows in detail the configuration of the control system.

The carrier controller 13 has a main control means 13a, a failure history information table 13b, a processor connection information table 13c, a processor state information table 13d, identification information holding means 13e, and communication means 13f which are connected to the main control means 13a. Further, the carrier controller 13 has switching means 13g connected to the identification information holding means 13e.

The carrier controller 13 controls the arms 12-1, 12-2, 12-3 and the gate valves 61, 62 and 63 so that a semiconductor wafer to be processed is carried from the load lock chamber 21 into an arbitrary one of the process processors 30, 40 and 50 and that the processed semiconductor wafer is then carried out from arbitrary one of the process processors 30, 40 and 50 to the unload lock chamber 22, and at the same time, the carrier controller 13 also controls the process controllers 33, 43 and 53 so that predetermined processes are respectively executed by the process processors 30, 40 and 50.

The failure history information table 13b is a table for storing information of failures (for example, discharge failure, pressure failure, electric source failure, etc.) occurring in the process processors 30, 40 and 50.

Figure 3:
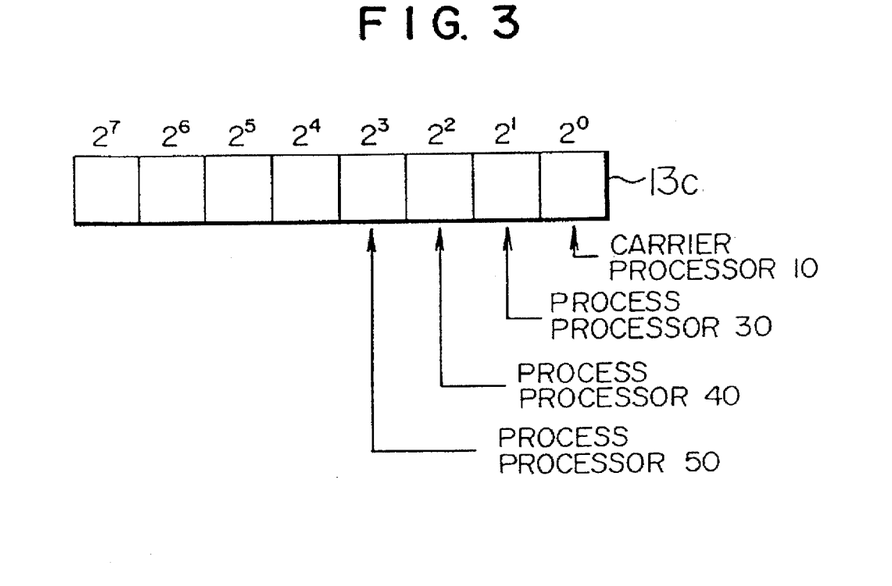
FIG. 3 is a view showing the configuration of a processor connection information table in this embodiment.

As shown in FIG. 3, the processor connection information table 13c is a table for storing the relations in connection between the carrier processor 10 and the process processors 30, 40 and 50.

Figure 4:
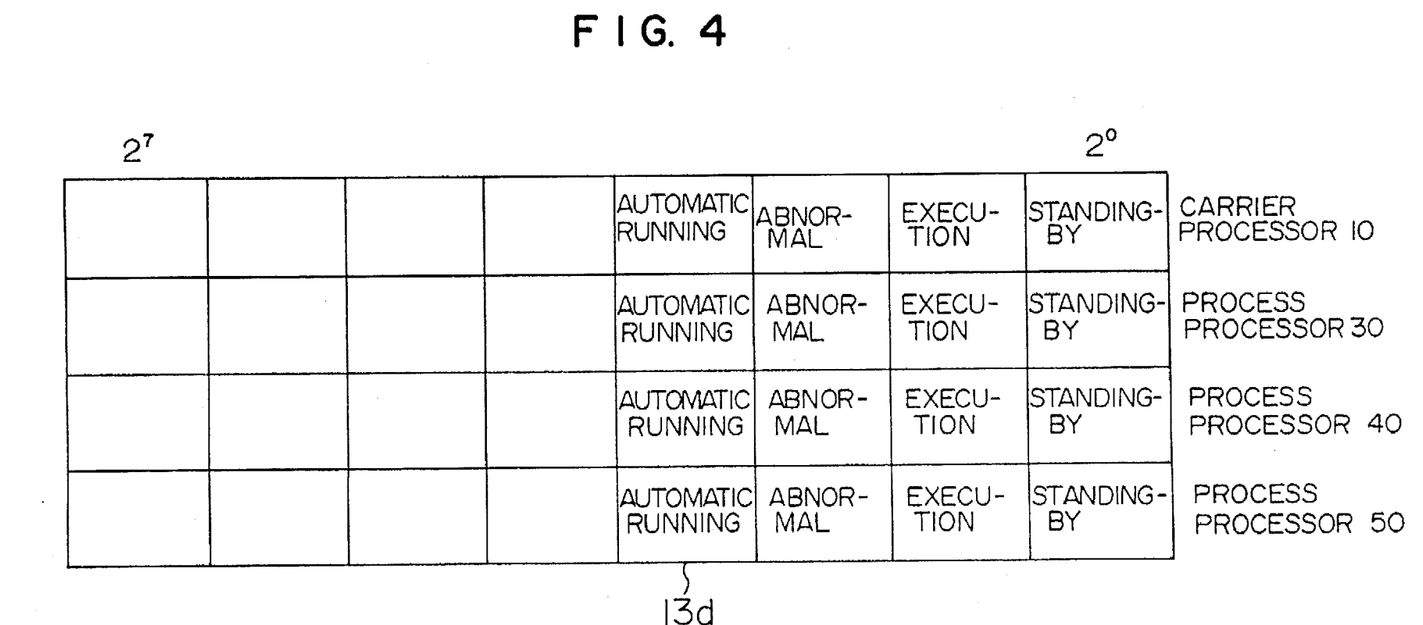
FIG. 4 is a view showing the configuration of a processor information table in this embodiment.

As shown in FIG. 4, the processor state information table 13d is a table for storing information for identification of the states (the states of control by the carrier controller 13 and the process controllers 33, 43 and 53) of the process processors 10, 30, 40 and 50.

Figure 5:
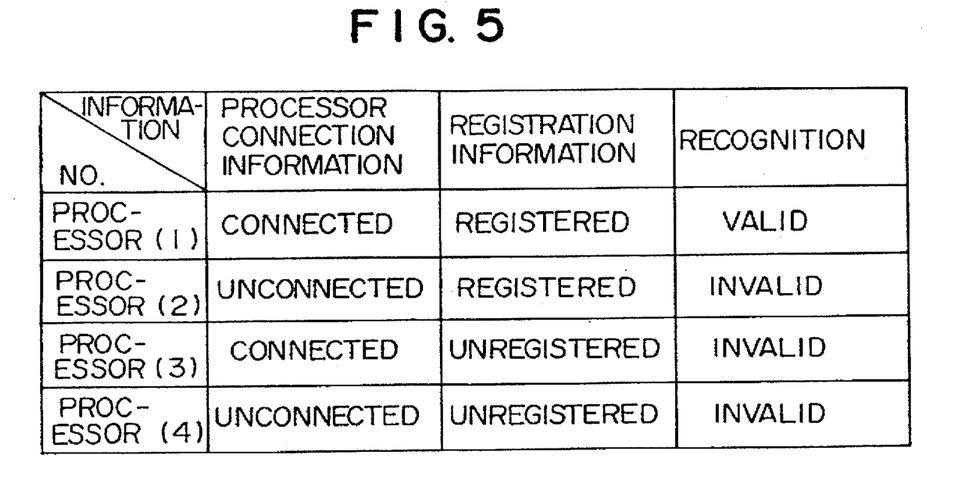
FIG. 5 is a view showing the configuration of a processor connection state logical judgment table in this embodiment.

The identification information holding means 13e stores a registration information signal given from the switching means 13g and a connection information signal given from the connection signal generating means which will be described later, and holds these signals as information for indicating whether the process processors 30, 40 and 50 are validly connected to the carrier processor 10, on the basis of a logical judgment as shown in FIG. 5.

The communication means 13f has a bi-directional communication function. A CSMA/CD communication system or a token-ring communication system is used as the communication means 13f. The communication means 13f communicates with the process controllers 33, 43 and 53 through a communication medium 71 such as a stranded cable, a coaxial cable, etc.

The switching means 13g generates a registration information signal for indication whether a predetermined one, or ones, of the process processors 30, 40 and 50 to be connected to the carrier processor 10 is connected to signal lines respectively assigned thereto. A dip switch operated by an operator, or the like, is used as the switching means 13g.

Alternatively, it is considered that the registration information may be stored in the switching means 13g. For example, an electrically erasable memory (EEPROM) may be used as the switching means 13g to store the registration information preliminarily.

The process controllers 33, 43 and 53 are provided independently of the carrier controller 13 and are connected so that signal transfer is made through the communication medium 71. The process controllers 33, 43 and 53 respectively have communication means 33a, 43a and 53a, subsidiary control means 33b, 43b and 53b, processor connection information tables 33c, 43c and 53c, and processor state information tables 33d, 43d and 53d which are connected to the communication means 13f through the communication medium 71. Further, the process controllers 33, 43 and 53 respectively have connection signal generating means 33e, 43e and 53e connected to the identification information holding means 13e.

The communication means 33a, 43a and 53a, processor connection information tables 33c, 43c and 53c and processor state information tables 33d, 43d and 53d are respectively formed in the same manner as the communication means 13f, processor connection information table 13c and processor state information table 13d of the carrier controller 13.

The subsidiary control means 33b, 43b and 53b execute predetermined control processes individually in response to control signals received from the carrier controller 13 and then return control results and control states.

The connection signal generating means 33e, 43e and 53e are means for respectively generating connection information signals expressing the fact that the process processors 30, 40 and 50 are connected to the carrier processor 10. Signals (for example, breaker-on signals) expressing the fact that the process controllers 33, 43 and 53 are connected to electric source circuits, or other digital signals, are used in the connection signal generating means 33e, 43e and 53e.

As another method by which the carrier processor 10 recognizes the connection information, it is considered that (i) the carrier processor may receive the connection information from the respective process processors via the communication means and may recognize the connection information or that (ii) the carrier processor may make a request for the connection information to process processors connected to the carrier processor and may recognize the connection information.

Terminal means 81 is controlled by the main control means 13a and is used for the double purpose of displaying guidance for operators and of inputting the sequence of processes to be executed by the process processors as relational information of process processor and process receipe number.

A control process executed by the main control means 13a in the operation of the semiconductor vacuum processing system will be described hereunder with reference to FIGS. 6 through 9.

Figure 6:
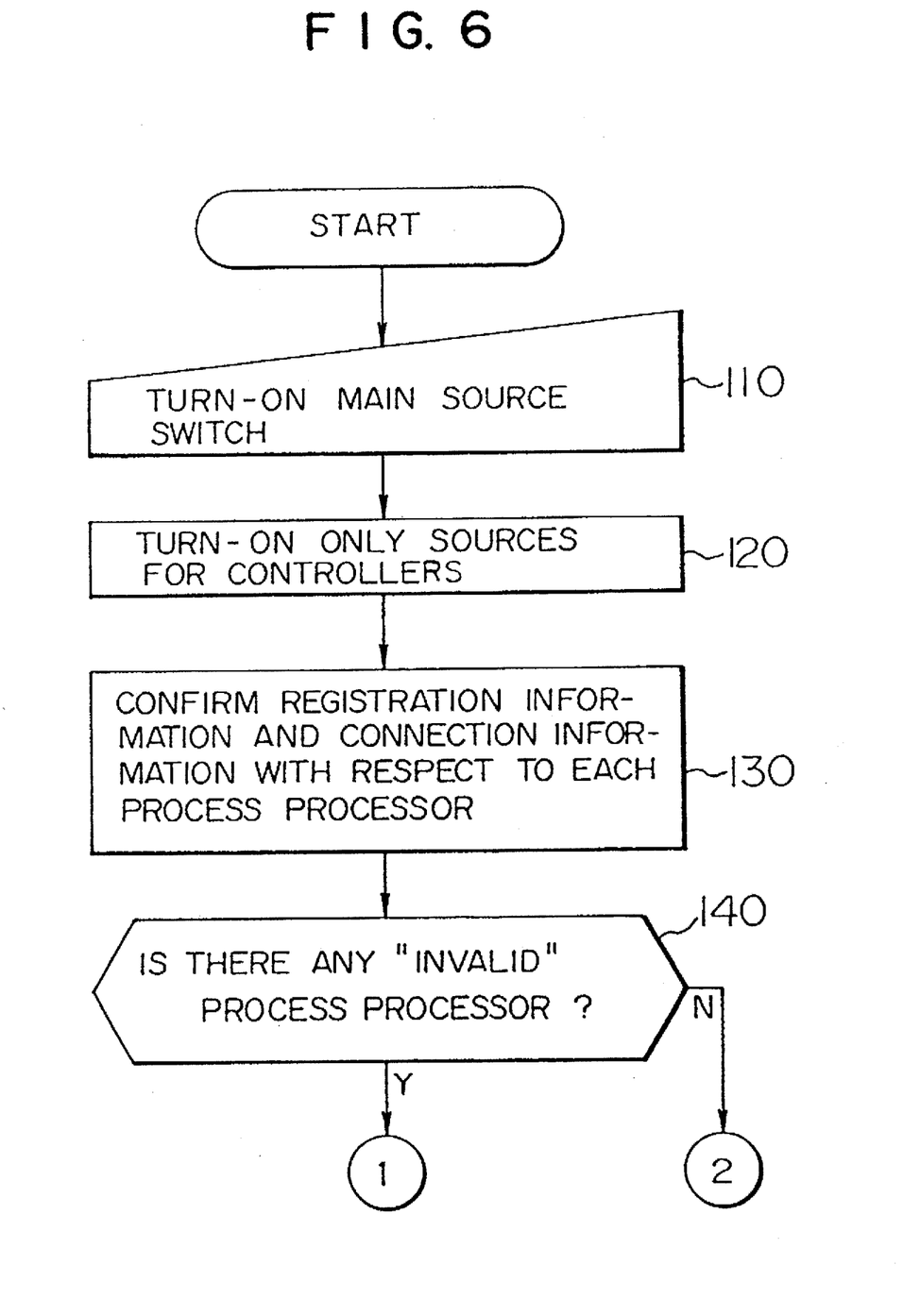
FIG. 6 is a flow chart of control executed by the main control means in this embodiment.

When a main electric source switch (not shown) for the semiconductor vacuum processing system is turned on in step 110, the routine goes to step 120 in which control electric sources for the process controllers 33, 43 and 53 are validated (turned on). Then, the routine goes to step 130 in which information stored in the identification information holding means 13e is confirmed, and then to step 140 in which a judgment as to whether there is any processor invalid in connection is made for displaying the connection state and the guidance for restoration. When there is a processor rendered invalid by its connection, the routine goes to step 150 shown in FIG. 7. When there is no processor invalid in regards to its connection, the routine goes to step 220 shown in FIG. 8.

Figure 7:
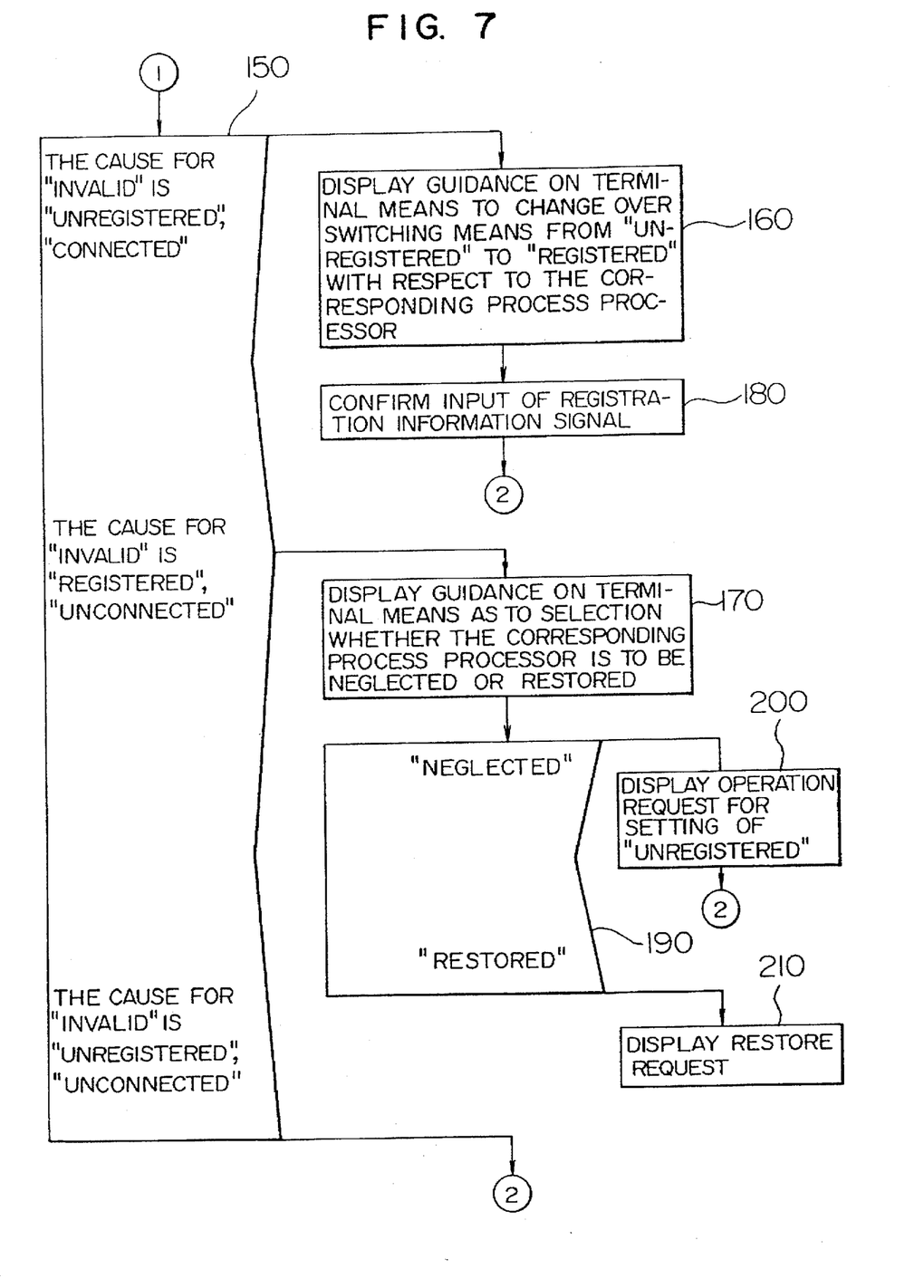
FIG. 7 is a flow chart of a control routine executed by the main control means in this embodiment.

Step 150 is a step for branching the control correspondingly to the cause of invalidity regards to the connection. In step 150, information stored in the identification information holding means 13e is judged logically. When registration information and connection information corresponding to the processor invalid in regards to its connection respectively express "unregistered" and "connected", the routine goes to step 160. When the registration information and the connection information respectively express "registered" and "unconnected", the routine goes to step 170. When the registration information and the connection information respectively express "unregistered" and "unconnected", the routine goes to step 220 shown in FIG. 8.

The state in which the registration information and the connection information respectively express "unregistered" and "connected" shows the case where the operation of registering a process processor by the switching means is idled after connection of the process processor. Accordingly, in step 160, guidance for turning the switching means 13g to "registered" with respect to the process processor is displayed on the terminal means 81. Then, in the step 180, the inputting of the registration information signal given from the switching means 13g is confirmed. Thereafter, the routine goes to step 220 shown in FIG. 8.

The state in which the registration information and the connection information respectively express "registered" and "unconnected" shows the case where the information signal of "connected" from the connection information generating means cannot be input because of the disconnection of the process processor for maintenance or because of a failure in the control electric source or the signal circuit. Accordingly, in step 170, guidance for requesting an input for selection as to whether the process processor is regarded as "unconnected" (neglected) or whether the process processor is used after restoration to a valid state (restored) is displayed on the terminal means 81. Then, in step 190, the inputting of selection given from the terminal means 81 is checked. When the selection is "neglected", guidance for operating the switching means to make the process processor "unregistered" is displayed on the terminal means 81 in step 200. When the selection is "restored", guidance for restoring the process processor is displayed on the terminal means 81 in step 210.

Figure 8:
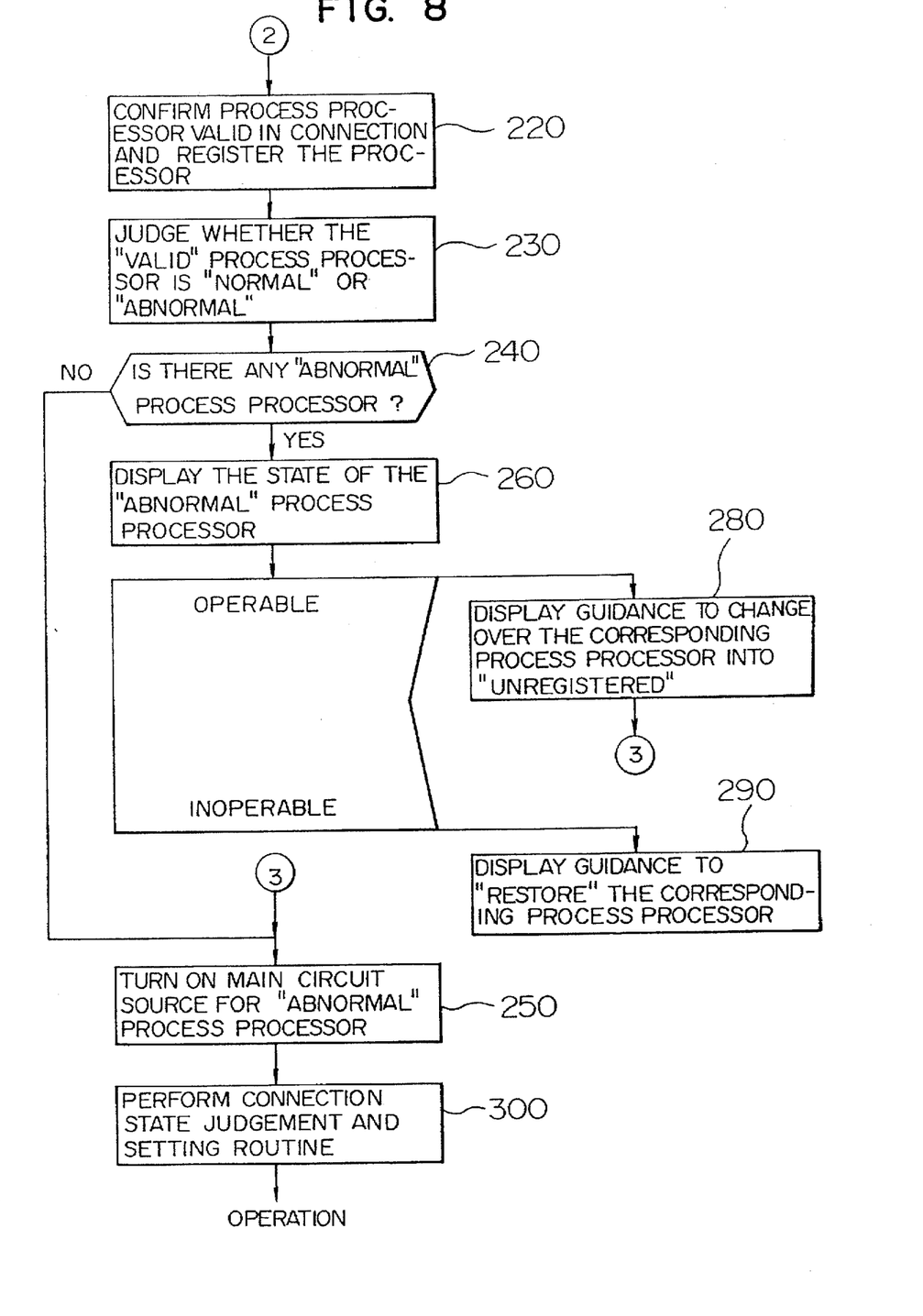
FIG. 8 is a further flow chart of a control routine executed by the main control means in this embodiment.

After the aforementioned control process is executed, in the routine shown in FIG. 8, the process processor validly connected to the carrier processor is confirmed and registered by reference to the connection information and the registration information stored in the identification information holding means 13e. Then, in step 230, a judgment is made by reference to the failure history information table 13d as to whether the "validly connected" process processor is normal or abnormal. Then, in step 240, a judgment is made as to whether there is any abnormal process processor.

When there is no abnormal process processor, the routine goes to step 250 in which the main circuit electric source for the normal process processor is turned on.

When there is an abnormal process processor, the routine goes to step 260 in which the abnormal process processor and the abnormal state thereof are displayed on the terminal means 81. Furthermore, in step 270, a Judgment is made as to whether the semiconductor vacuum processing apparatus can be operated while the abnormal process processor is connected to the carrier processor. When the apparatus can be operated, guidance for operating the switching means 13g to make registration information corresponding to the abnormal process processor "unregistered" is displayed on the terminal means 81 in step 280 and then the routine goes back to step 250. When the system cannot be operated, guidance for restoring the abnormal process processor is displayed on the terminal means 81 in step 290.

Then, in the step 300, a process processor connection state judging and setting routine is carried out and then the situation of the routine goes to the vacuum processing operation.

Figure 9:
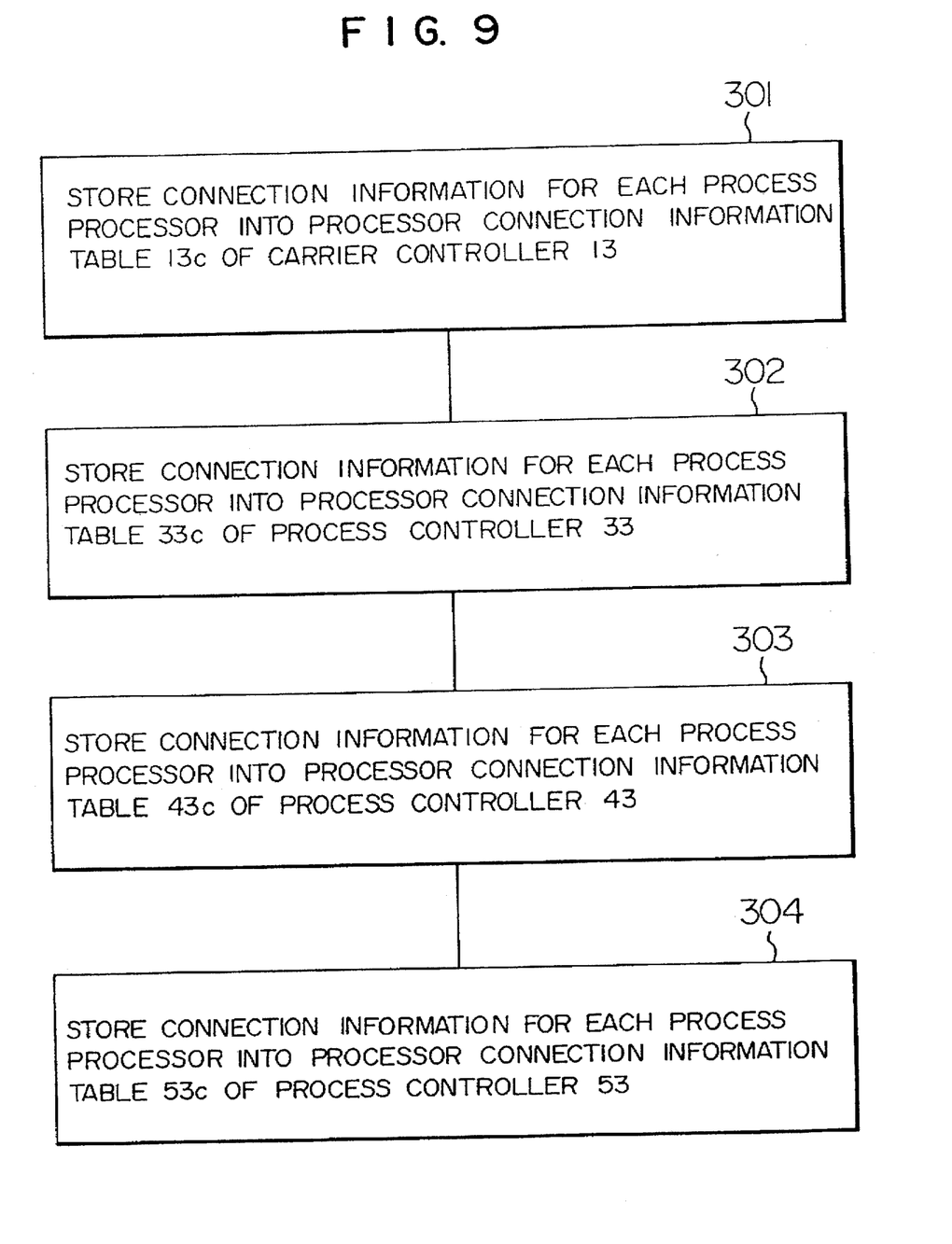
FIG. 9 is yet another flow chart of a control routine executed by the main control means in this embodiment.

The routine of step 300 is shown in FIG. 9. In step 301, identification information stored in the identification information holding means 13e is read and subjected to a judgment as to whether the process processors 30, 40 and 50 are validly connected, so that judgment results are stored in the processor connection information table 13c. Because this embodiment shows the case where three process processors 30, 40 and 50 are validly connected to the carrier processor 10, the data stored in the processor connection information table 13c is "00001111" (validly connected: 1, unconnected or invalidly connected: 0).

Then, in the step 302, the connection information is transmitted to the process controller 33 and stored in the processor connection information table 33c of the processor controller 33.

Similarly, in step 303, the connection information is transmitted to the process controller 43 and stored in the processor connection information table 43c of the processor controller 43.

Likewise, in step 304, the connection information is transmitted to the process controller 53 and stored in the processor connection information table 53c of the processor controller 53.

In the vacuum processing operation, a process of checking the states of the process processors 10, 30, 40 and 50 at any time and altering the data stored in the processor state information tables 13d, 33d, 43d and 53d on the basis of the state information is carried out. The process processors having the connection information and the state information stored therein can carry out respective processes while control signals are transferred, on the mutual recognition of information of the process processors.

As described above, according to the present invention, matching between an actually connected process processor and a registered process processor is judged logically by reference to processor connection information and processor registration in formation, so that the problem associated with conventional systems whereby process controlling is started while the two are mismatched can be eliminated.

Furthermore, the mismatched process processor can be used or restored properly through displaying the mismatching state on the terminal means, so that the working ratio of the system can be improved.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A method of controlling a wafer vacuum processing apparatus, said method comprising the steps of recognizing at least the following states:
   (a) a state in which a plurality of process processors are connected to a static carrier processor, and
   (b) a normal state of said plural processors; and
   after the recognition, the following steps are executed:
   (c) fetching a wafer from a cassette,
   (d) transporting said wafer fetched from said cassette to the process chamber of a voluntary one of said process processors through said static carrier processor,
   (e) processing said wafer in said process chamber,
   (f) transporting said processed Wafer to said static carrier processor from said process chamber,
   (g) transporting the processed wafer from the carrier processor to said cassette or another cassette, and
   (h) receiving said processed wafer in said cassette or said another cassette.

2. A method of controlling a wafer vacuum processing apparatus according to claim 1, wherein said static carrier processor has an arm to carry said wafer.

3. A method of controlling a wafer vacuum processing apparatus according to claim 1, wherein said steps (c) to (h) are repeated until the completion of the process of said wafer in said cassette or said another cassette.

4. A method of controlling a wafer vacuum processing apparatus, said method comprising the steps of recognizing at least the following states:
   (a) a state in which a plurality of process processors are effectively connected to a static carrier processor, and
   (b) a normal state of said plural process processors; and
   after the recognition, and in the operation condition in which a non-connected processor is separated, the following steps are executed:
   (c) fetching a wafer from a cassette,
   (d) transporting said wafer fetched from said cassette to the process chamber of a voluntary one of said process processors, without any failure therein, through said static carrier processor,
   (e) processing said wafer in said process chamber,
   (f) transporting said processed wafer to said static carrier processor from said process chamber,
   (g) transporting the processed wafer from the carrier processor to said cassette or another cassette, and
   (h) receiving said processed wafer in said cassette or said another cassette.

5. A method of controlling a wafer vacuum processing apparatus according to claim 2, wherein said static carrier processor has an arm to carry said wafer.

6. A method of controlling a wafer vacuum processing apparatus according to claim 2, wherein said steps (c) to (h) are repeated until the completion of the process of said wafer in said cassette or said another cassette.

* * * * *